United States Patent [19]

Schmidt

[11] Patent Number: 5,136,487
[45] Date of Patent: Aug. 4, 1992

[54] MUSICAL DRUM LIGHTING APPARATUS

[76] Inventor: Randall S. Schmidt, 7950 S. Wake Forest Dr., Oak Creek, Wis. 53134

[21] Appl. No.: 732,614

[22] Filed: Jul. 19, 1991

[51] Int. Cl.⁵ .............................................. H04M 1/22
[52] U.S. Cl. ..................................... 362/86; 362/253; 362/802
[58] Field of Search ................ 362/86, 103, 105, 127, 362/253, 396, 802, 276

[56] References Cited

U.S. PATENT DOCUMENTS

| | | | |
|---|---|---|---|
| 3,346,732 | 10/1967 | Crusius | 362/86 |
| 4,355,348 | 10/1982 | Williams | 362/253 |
| 4,690,242 | 9/1987 | Mark | 362/802 |
| 4,823,240 | 4/1989 | Shenker | 362/253 |

Primary Examiner—Ira S. Lazarus
Assistant Examiner—Sue Hagarman
Attorney, Agent, or Firm—Leon Gilden

[57] ABSTRACT

An apparatus wherein a plurality of drum members each are mounted to a central framework. Each of the drum members mounts a microphone thereto, wherein the microphone is spaced from a strobe effect light, wherein the strobe effect light operative through an on/off switch includes an amplifier and a sound-activated switch directing power to an illumination member of the strobe effect light to provide a strobe effect responsive to vibration effected by each of the drum members to provide a desired visual impact during use of the drum members.

5 Claims, 7 Drawing Sheets

MUSICAL DRUM LIGHTING APPARATUS

BACKGROUND OF THE INVENTION

1. Field of the Invention

The field of invention relates to lighting apparatus, and more particularly pertains to a musical drum lighting apparatus wherein the same is arranged to effect selective actuation of an associated light member in response to vibratory musical striking of an associated drum member.

2. Description of the Prior Art

Various illumination members are utilized in association with musical instruments. For example, U.S. Pat. No. 4,563,933 to Kim sets forth a dynamically illuminated guitar, wherein the guitar provides for visual and sequential lighting effects upon repositioning of the guitar body and an individual's hand thereon.

U.S. Pat. No. 4,121,488 to Akiyama sets forth a flexible mat structure with a plurality of flexible switches mounted therewithin adapted to produce corresponding musical sounds on marks configured on the surface of the mat to indicate position of each switch member as stepped upon.

U.S. Pat. No. 4,722,035 to Rapisarda sets forth a drum stick with a light emitting diode for illumination of the drum stick.

As may be appreciated therefore, the prior art has set forth various musical organizations to correspond to associated lighting effects for enhanced visual effect in association with audible usage of the organization, wherein the instant invention attempts to overcome deficiencies of the prior art by providing an organization that provides strobe light effects upon actuation of an associated matrix of drum members.

SUMMARY OF THE INVENTION

In view of the foregoing disadvantages inherent in the known types of musical lighting apparatus now present in the prior art, the present invention provides a musical drum lighting apparatus wherein the same effects sequential lighting of strobe like light members upon vibration of associated drum members. As such, the general purpose of the present invention, which will be described subsequently in greater detail, is to provide a new and improved musical drum lighting apparatus which has all the advantages of the prior art musical lighting apparatus and none of the disadvantages.

To attain this, the present invention provides an apparatus wherein a plurality of drum members each are mounted to a central framework. Each of the drum members mounts a microphone thereof, wherein the microphone is spaced from a strobe effect light, wherein the strobe effect light is operative through an on/off switch including an amplifier and a sound-activated switch directing power to an illumination member of the strobe effect light to provide a strobe effect responsive to vibration effected by each of the drum members to provide a desired visual impact during use of the drum members.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved musical drum lighting apparatus which has all the advantages of the prior art musical lighting apparatus and none of the disadvantages.

It is another object of the present invention to provide a new and improved musical drum lighting apparatus which may be easily and efficiently manufactured and marketed.

It is a further object of the present invention to provide a new and improved musical drum lighting apparatus which is of a durable and reliable construction.

An even further object of the present invention is to provide a new and improved musical drum lighting apparatus which is susceptible of a low cost of manufacture with regard to both materials and labor, and which accordingly is then susceptible of low prices of sale to the consuming public, thereby making such musical drum lighting apparatus economically available to the buying public.

Still yet another object of the present invention is to provide a new and improved musical drum lighting apparatus which provides in the apparatuses and methods of the prior art some of the advantages thereof, while simultaneously overcoming some of the disadvantages normally associated therewith.

Still another object of the present invention is to provide a new and improved musical drum lighting apparatus wherein the same is arranged to effect operation of strobe like effects upon actuation of an associated drum assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2b is an orthographic side view, taken in elevation, of the light member as illustrated in FIG. 2a.

DESCRIPTION OF THE PREFERRED EMBODIMENT

With reference now to the drawings, and in particular to FIGS. 1 to 9 thereof, a new and improved musical drum lighting apparatus embodying the principles and concepts of the present invention and generally designated by the reference numeral 10 will be described.

Figure 1:
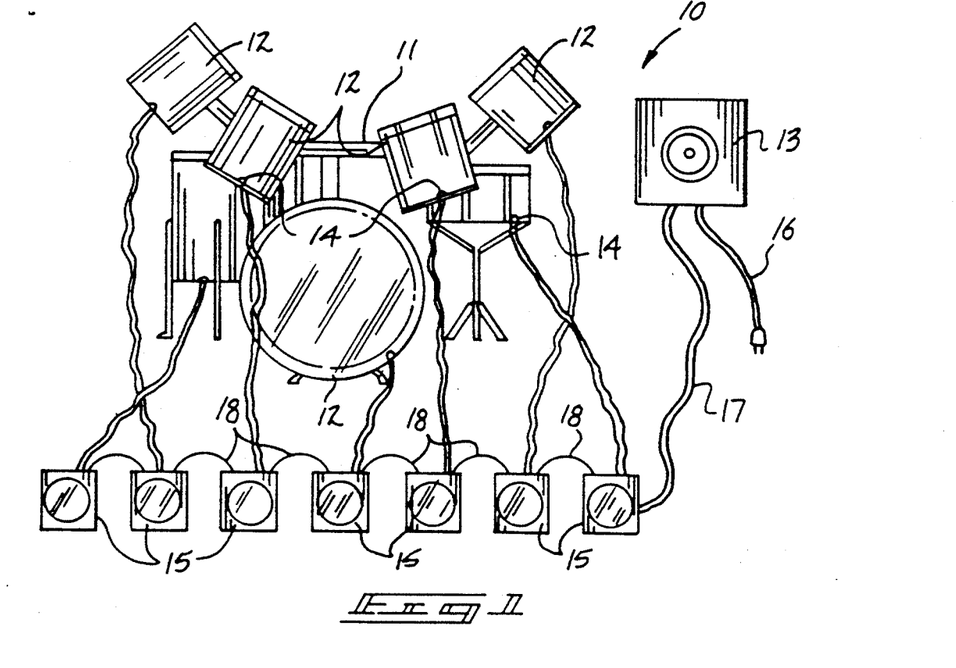
FIG. 1 is an orthographic illustration of the instant invention.
Figure 2:
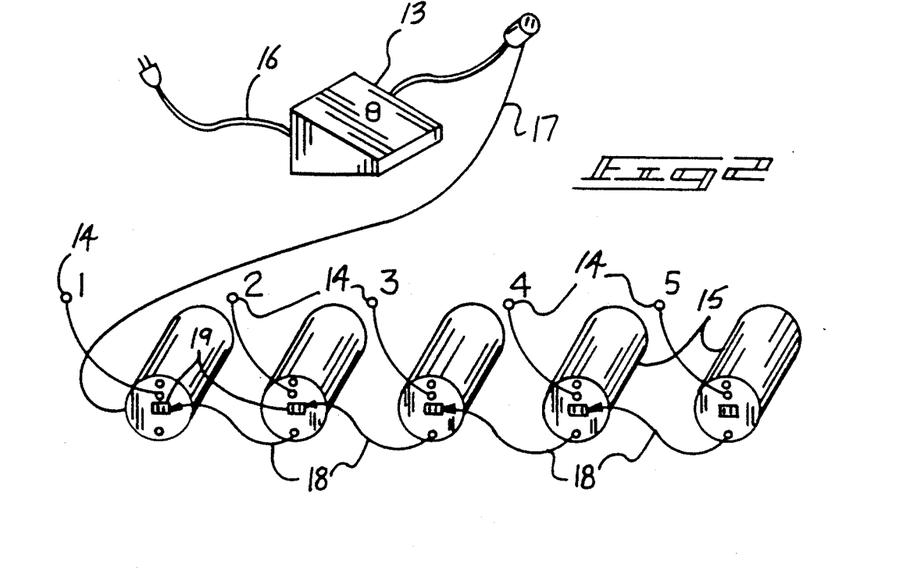
FIG. 2 is an isometric illustration of the light members in electrical association with an on/off switch.
Figure 2A:
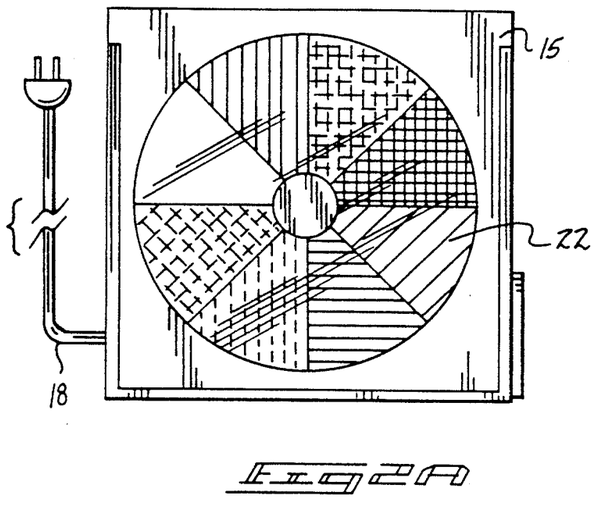
FIG. 2a is an orthographic front view, taken in elevation, of a light member utilized by the instant invention.

More specifically, the musical drum lighting apparatus 10 of the instant invention essentially comprises a central drum framework 11, with the framework mounting a matrix of drum member housings 12 thereon. The drum member housings include a cylindrical side wall, wherein each cylindrical side wall mounts an associated microphone 14. Each microphone includes an electrical connection to electrically associate each microphone with an associated strobe effect light member 15. Each light member 15 is interconnected through a light member transfer electrical supply cord 18. Each housing includes an electrical supply cord 18 to be received within a light member electrical receptacle socket 19 with an adjacent light member 15. A primary foot operated on/off switch member 13 receives electrical energy through a primary power supply cord 16 and directs that energy through the light members 15 through an on/off switch power supply cord 17. Each of the light members includes a light member housing 20, with each light member housing 20 including a rear wall formed with a rear wall projection 21 and a forward wall mounting a translucent light panel 22 therewithin. The microphones 14 each include a microphone power supply cord 23 directing each microphone into the housing, with each microphone including double faced tape 24 for securement of each microphone to the associated surface of each drum member 12. The clamp structure could alternatively utilize commercially available double faced tape in the interests of economy if required. The housing side wall projection 21 rotatably mounts a light member housing clamp 25 defined by a second spring biased jaw pair, as opposed to the first spring biased jaw pair mounted and defining the microphone clamp 24. The second spring biased jaw pair of the light member housing clamp 25 includes a second clamp pivot boss 26 rotatably mounted relative to the rear wall projection 21 utilizing a pivot boss clamp 27 permitting relative rotation of the light member housing clamp 25 relative to the rear wall projection 21. FIG. 2d illustrates the microphone 14 directing electrical energy into the associated housing 20 and directing that energy through a sound amplifier 28 that is operative through a sound activated switch 29 to effect selective actuation of the translucent light panel 22 through an associated light member within the housing. A transparent light panel could alternatively be utilized but limited in light diffusion capacity.

FIGS. 3, 3a, 4, and 5 illustrate typical circuitry that may be utilized by the instant invention and whose workings are known to one of ordinary skill in the art.

Figure 6:
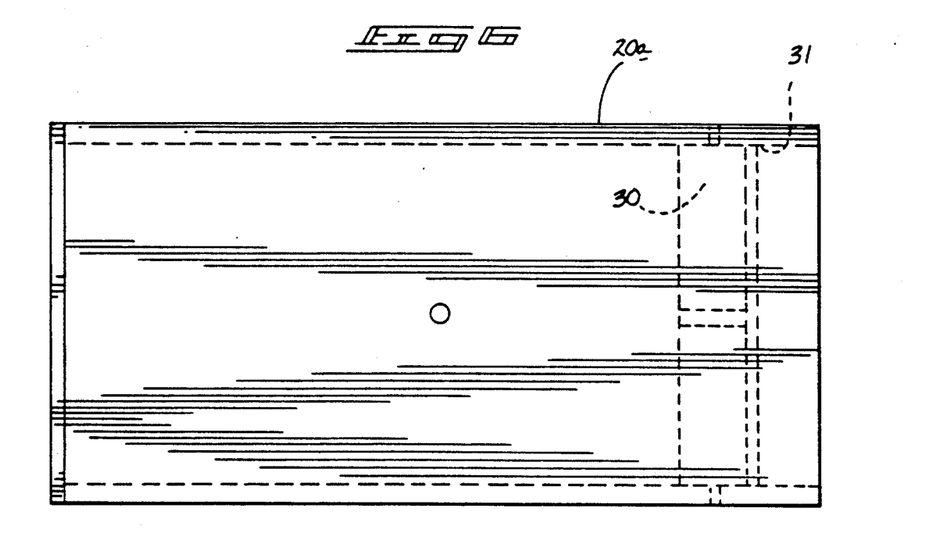
FIG. 6 is an orthographic side view of a modification of the light housing, as utilized by the instant invention.
Figure 7:
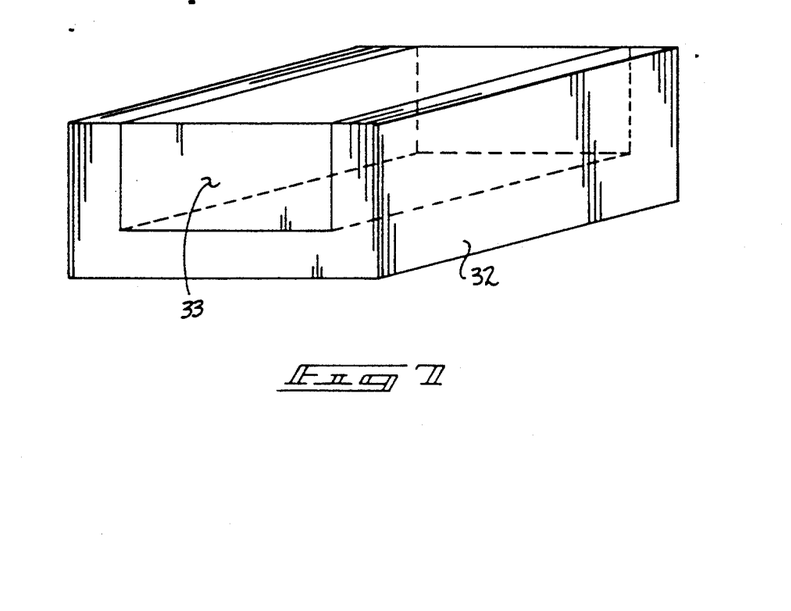
FIG. 7 is an isometric illustration of a light member housing support utilized by the instant invention.
Figure 8:
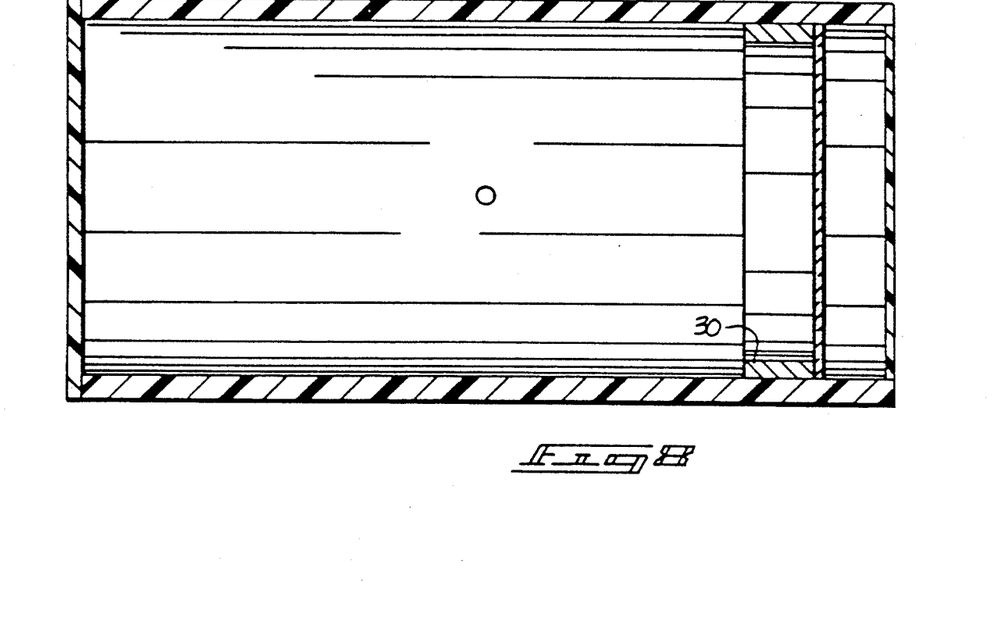
FIG. 8 is an orthographic cross-sectional illustration of the light housing as set forth in FIG. 6.
Figure 9:
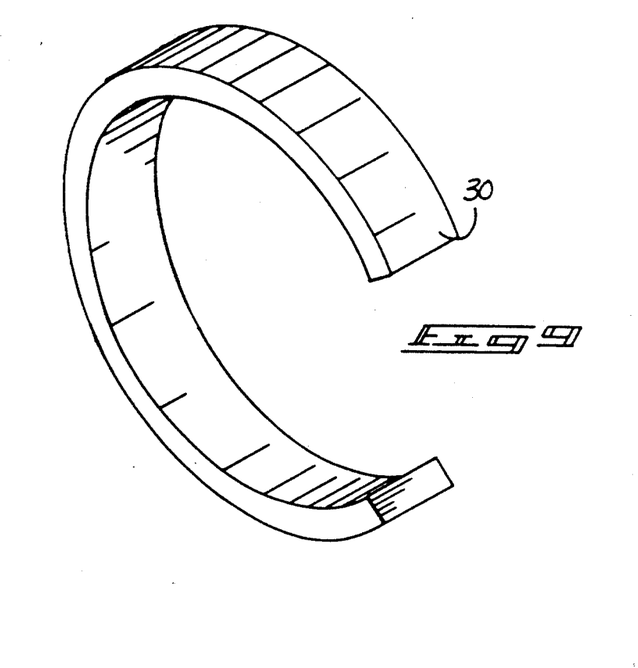
FIG. 9 is an isometric illustration of a clamping ring utilized within the light housing, as set forth in FIG. 8.

FIG. 7 illustrates the use of a support cradle 32 formed with a "C" shaped support channel 33 for mounting the circuit board in an alternate manner each associated housing 20 or alternatively, a modified housing 20a as illustrated in FIGS. 6 and 8 within the "C" shaped channel 33. The cradle alternatively may simply support the circuit board structure. As the support cradle 32 is formed of a polymeric foam, cushioning of the organization is provided to prolong its effective life in use. The modified housing 20a utilizes a panel mounting ring 30 formed within a housing cavity 31. The panel mounting ring 30 may be utilized to secure if desired the various panel circuitry and the like within the housing 20a.

Figure 2B:
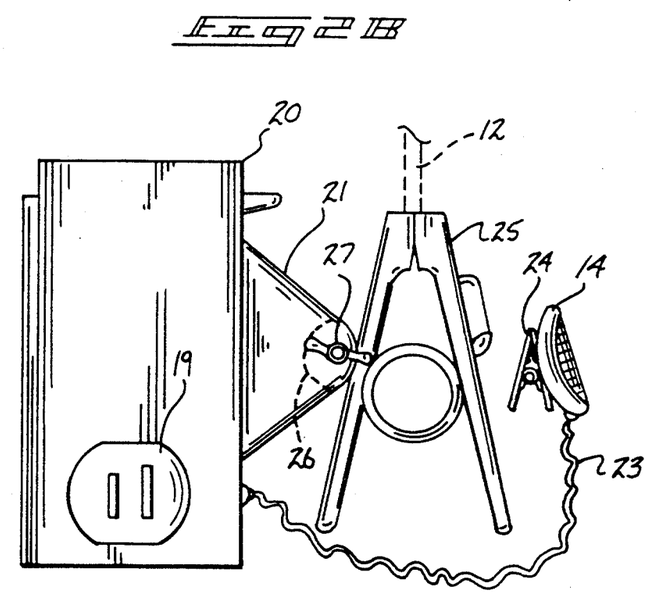
Figure 2C:
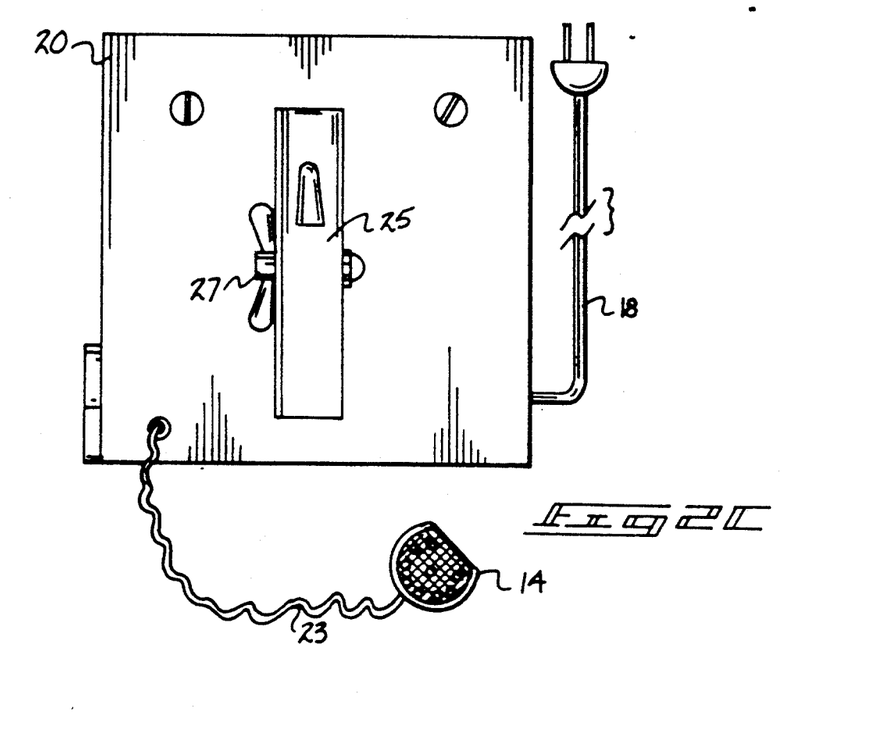
FIG. 2c is a rear orthographic view of the light member as illustrated in FIGS. 2a and 2b.
Figure 2D:
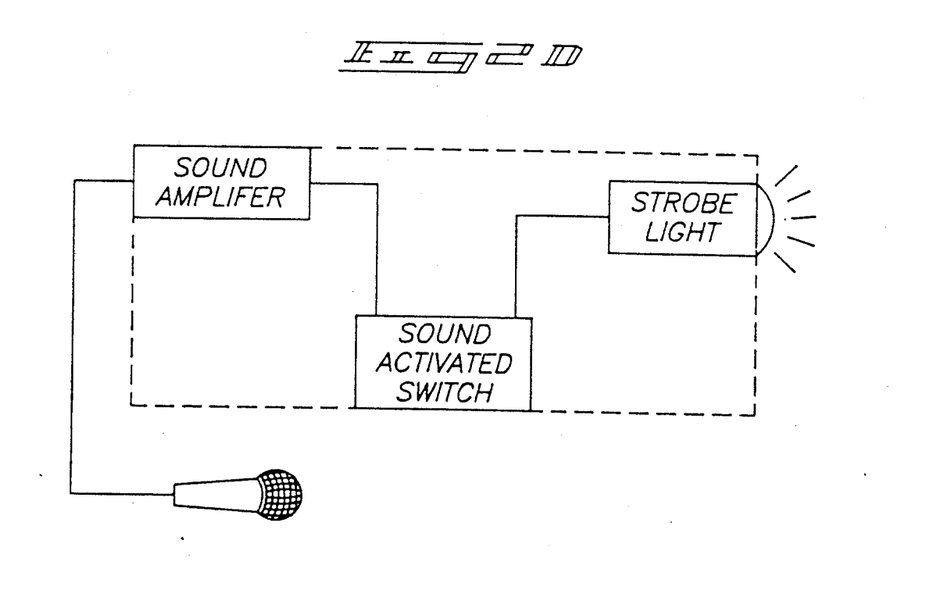
FIG. 2d is a diametrical illustration of the microphone in association with each light member housing.
Figure 3:
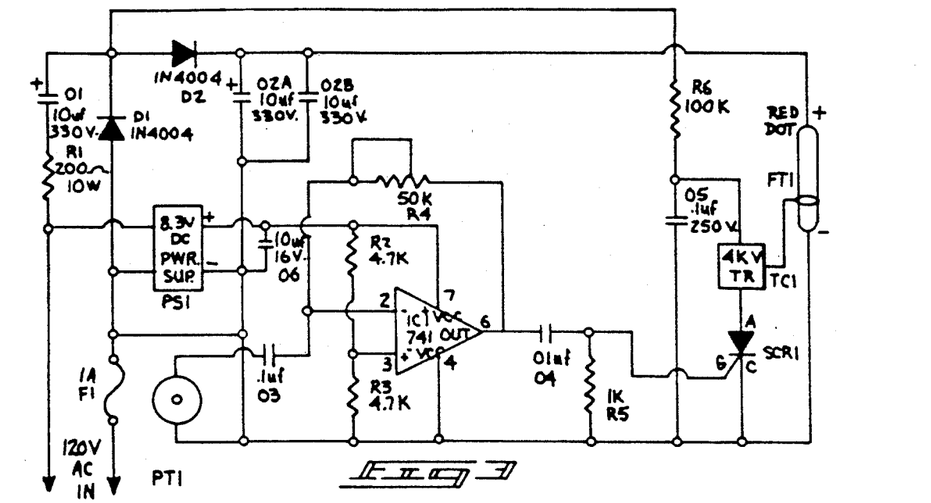
FIGS. 3, 3a, 4, and 5 set forth electrical circuitry as may be utilized by the instant invention.
Figure 3A:
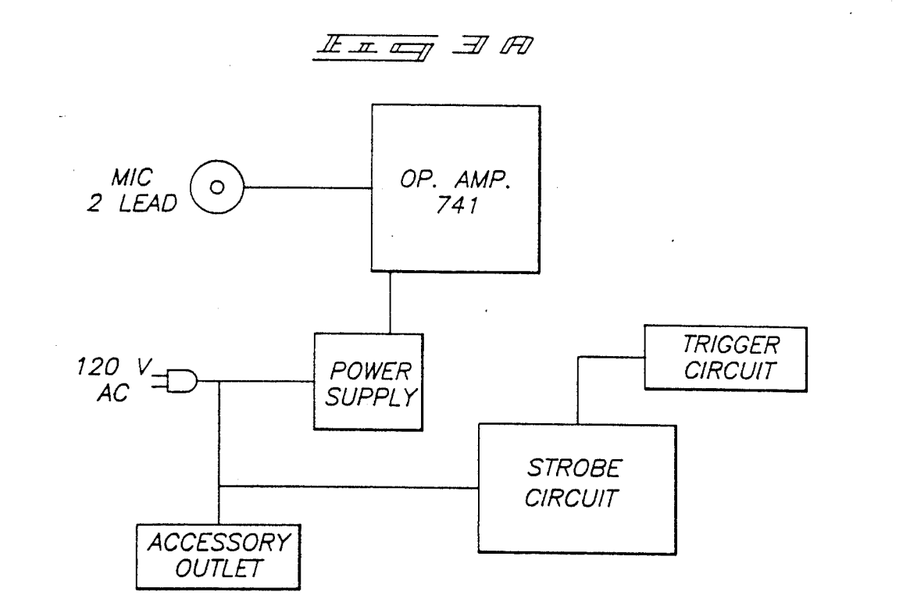
Figure 4:
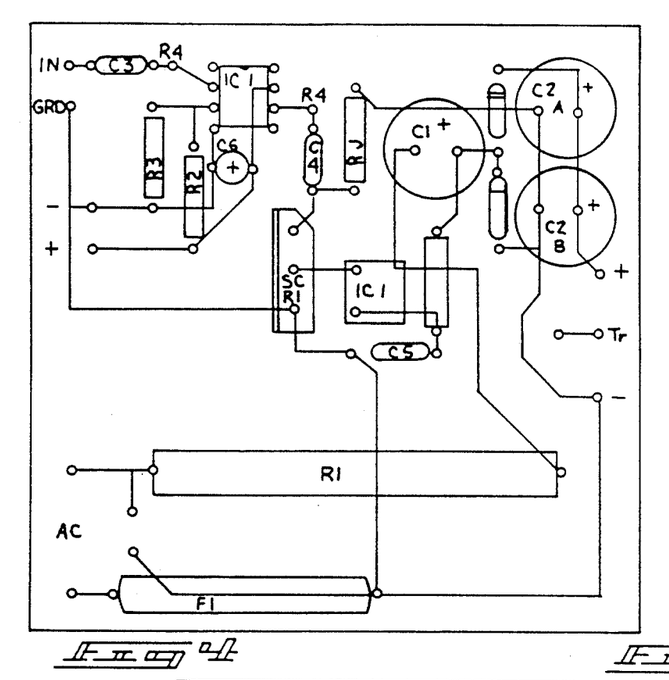
Figure 5:
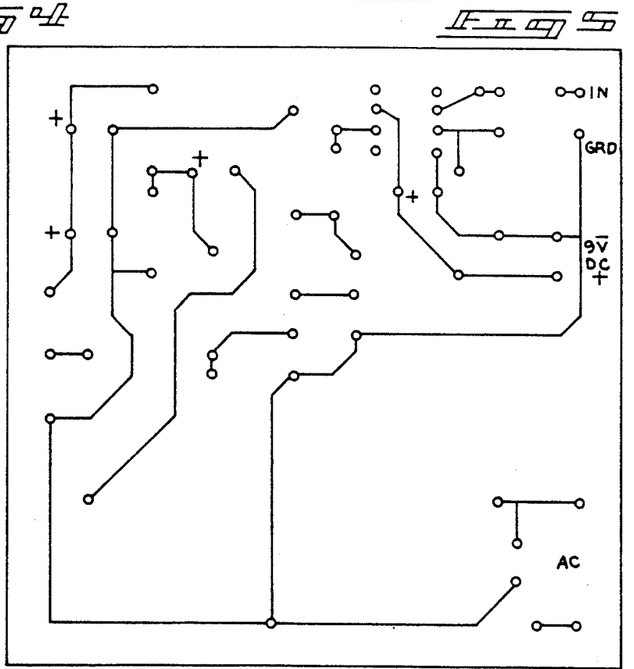

It should be noted that the respective first and second spring-biased jaw pairs 24 and 25, as illustrated in FIG. 2b, permit selective securement of each of the microphones and housings 20 to a respective drum member housing 12, or alternatively, each of the housings 20 may be mounted in a remote orientation relative to an associated drum member housing upon the support cradle 32. The microphone and housing are interconnected by a shielded conductor of conventional use in contemporary electronic circuitry.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A musical drum lighting apparatus, comprising in combination,
   a central framework, the framework mounting a plurality of drum members fixedly thereto, each drum member including a cylindrical side wall, and
   a microphone member securable to each cylindrical side wall, and each microphone member including a microphone power supply cord, each power supply cord directed into a light member housing, and each light member housing in electrical communication relative to one another, and
   a foot operated on/off switch in electrical communication with at least one light member housing, and
   each light member housing including a sound actuated switch in electrical communication with the microphone power supply cord, and
   an illumination member mounted within the light member housing, with the light member switch in electrical communication with the illumination member, whereupon audible actuation of each drum member effects illumination of a respective illumination member.

2. An apparatus as set forth in claim 1 wherein the light member housing includes a light member housing rear wall, and the rear wall includes a rear wall projection, the rear wall projection includes a light member housing clamp, the light member housing clamp includes a clamp pivot boss, the clamp pivot boss rotatably mounted to the rear wall projection, and a pivot boss clamp to effect selective securement of the pivot boss relative to the rear wall projection.

3. An apparatus as set forth in claim 1 wherein each microphone includes a microphone spring-biased jaw pair, and the jaw pair is selectively securable to the cylindrical side wall of said drum member.

4. An apparatus as set forth in claim 3 wherein each light member housing includes an amplifier in electrical communication with the microphone power supply cord, the amplifier in electrical communication with a sound activated switch, and the sound activated switch in electrical communication with the illumination member.

5. An apparatus as set forth in claim 1 including a polymeric foam support cradle, the support cradle including a "C" shaped support channel, the "C" shaped support channel receiving a light member housing therewithin.

* * * * *